United States Patent
Reddell et al.

(10) Patent No.: US 11,429,085 B2
(45) Date of Patent: Aug. 30, 2022

(54) SYSTEMS AND METHODS FOR THERMAL CONTROL OF AN INFORMATION HANDLING RESOURCE USING THERMOELECTRIC EFFECT

(71) Applicant: Dell Products L.P., Round Rock, TX (US)

(72) Inventors: Aubreye Reddell, Austin, TX (US); John R. Palmer, Georgetown, TX (US); Troy A. Tiritilli, Round Rock, TX (US); Jeremiah Bartlett, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 26 days.

(21) Appl. No.: 16/886,157

(22) Filed: May 28, 2020

(65) Prior Publication Data
US 2021/0373531 A1    Dec. 2, 2021

(51) Int. Cl.
*G05B 19/4155* (2006.01)
*G06F 1/20* (2006.01)

(52) U.S. Cl.
CPC ......... *G05B 19/4155* (2013.01); *G06F 1/206* (2013.01); *G05B 2219/37268* (2013.01); *G05B 2219/49216* (2013.01)

(58) Field of Classification Search
CPC .......... G06F 1/206; G05B 2219/37268; G05B 19/4155; G05B 2219/49216
See application file for complete search history.

(56) References Cited

U.S. PATENT DOCUMENTS

| | | | | |
|---|---|---|---|---|
| 10,939,537 B1 * | 3/2021 | Lebron | ................... | H05K 1/185 |
| 2012/0204577 A1 * | 8/2012 | Ludwig | ................... | F25B 21/04 |
| | | | | 62/3.3 |
| 2014/0260330 A1 * | 9/2014 | Karlstedt | ................ | F25B 21/02 |
| | | | | 62/3.3 |
| 2019/0024953 A1 * | 1/2019 | Thao | ................... | H05K 7/20009 |

* cited by examiner

*Primary Examiner* — Nimesh G Patel
(74) *Attorney, Agent, or Firm* — Jackson Walker L.L.P.

(57) ABSTRACT

A system may include an air mover configured to drive a flow of air, a heat-generating component in a path of the flow of air, an assembly comprising heat-rejecting media and a thermoelectric cooling apparatus thermally coupled to the heat-rejecting media and arranged such that the heat-rejecting media is in the path of the flow of air between the air mover and the heat-generating component, and a thermal control system communicatively coupled to the thermoelectric cooling apparatus and configured to control an electrical parameter applied to the thermoelectric cooling apparatus in order to create a temperature gradient across the thermoelectric cooling apparatus, such that when the electrical parameter is applied to the thermoelectric cooling apparatus, heat is transferred from the flow of air to the thermoelectric cooling apparatus via the heat-rejecting media.

20 Claims, 4 Drawing Sheets

SYSTEMS AND METHODS FOR THERMAL CONTROL OF AN INFORMATION HANDLING RESOURCE USING THERMOELECTRIC EFFECT

TECHNICAL FIELD

The present disclosure relates in general to information handling systems, and more particularly to cooling of information handling system components using a thermoelectric cooling apparatus, in conjunction with or in lieu of airflow-based cooling.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As processors, graphics cards, random access memory (RAM) and other components in information handling systems have increased in clock speed and power consumption, the amount of heat produced by such components as a side-effect of normal operation has also increased. Often, the temperatures of these components need to be kept within a reasonable range to prevent overheating, instability, malfunction and damage leading to a shortened component lifespan. Accordingly, air movers (e.g., cooling fans and blowers) have often been used in information handling systems to cool information handling systems and their components.

For example, using existing approaches, general purpose graphics processing units (GPGPUs) are typically located toward the rear of a server chassis, and are usually cooled passively by air movers. Due to this location of the GPGPU cards, the air the card receives from the air movers may be preheated by other components of an information handling system which are in line with the airflow for the GPGPU card. For proper operation, a GPGPU must often remain within a specified temperature limit, which is more challenging with warmer ambient temperatures.

Often, the first choice to sufficiently cool a GPGPU card is to increase an airflow rate to the GPGPU card; the faster the airflow rate at a consistent temperature, the more heat can be dissipated. However, after the air movers reach their speed limit and the peak airflow rate is achieved, the only current solution available using existing approaches to cool a component within an information handling system is to reduce the allowable ambient temperatures of the information handling system. GPGPU-ready server configurations already require the use of the highest performance air movers and they often run at the maximum speed while the GPGPU is active. As GPGPUs continue to be developed, they will consume more power, produce more heat, and need more efficient cooling to function at peak performance.

SUMMARY

In accordance with the teachings of the present disclosure, the disadvantages and problems associated with traditional approaches to cooling information handling system components may be substantially reduced or eliminated.

In accordance with embodiments of the present disclosure, a system may include an air mover configured to drive a flow of air, a heat-generating component in a path of the flow of air, an assembly comprising heat-rejecting media and a thermoelectric cooling apparatus thermally coupled to the heat-rejecting media and arranged such that the heat-rejecting media is in the path of the flow of air between the air mover and the heat-generating component, and a thermal control system communicatively coupled to the thermoelectric cooling apparatus and configured to control an electrical parameter applied to the thermoelectric cooling apparatus in order to create a temperature gradient across the thermoelectric cooling apparatus, such that when the electrical parameter is applied to the thermoelectric cooling apparatus, heat is transferred from the flow of air to the thermoelectric cooling apparatus via the heat-rejecting media.

In accordance with these and other embodiments of the present disclosure, a method may include, in a system comprising an air mover configured to drive a flow of air, a heat-generating component in a path of the flow of air, causing a flow of air driven from an air mover to be driven in a path of the flow of air proximate to heat-rejecting media of an assembly comprising the heat-rejecting media and a thermoelectric cooling apparatus thermally coupled to the heat-rejecting media and arranged such that the heat-rejecting media is in the path of the flow of air between the air mover and the heat-generating component and controlling an electrical parameter applied to the thermoelectric cooling apparatus in order to create a temperature gradient across the thermoelectric cooling apparatus, such that when the electrical parameter is applied to the thermoelectric cooling apparatus, heat is transferred from the flow of air to the thermoelectric cooling apparatus via the heat-rejecting media.

In accordance with these and other embodiments of the present disclosure, an assembly may include a heat-generating component, heat-rejecting media, and a thermoelectric cooling apparatus thermally coupled to the heat-rejecting media, wherein the thermoelectric cooling apparatus is configured to create a temperature gradient across the thermoelectric cooling apparatus when an electrical parameter is applied to the thermoelectric cooling apparatus, such that when the electrical parameter is applied to the thermoelectric cooling apparatus, heat is transferred from a flow of air to the thermoelectric cooling apparatus via the heat-rejecting media. The assembly may be arranged such that the heat-rejecting media is configured to be in a path of the flow of air between an air mover and the heat-generating component.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Preferred embodiments and their advantages are best understood by reference to FIGS. 1 through 4C, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, buses, memories, I/O devices and/or interfaces, storage resources, network interfaces, motherboards, integrated circuit packages; electro-mechanical devices (e.g., air movers), displays, and power supplies.

Figure 1:
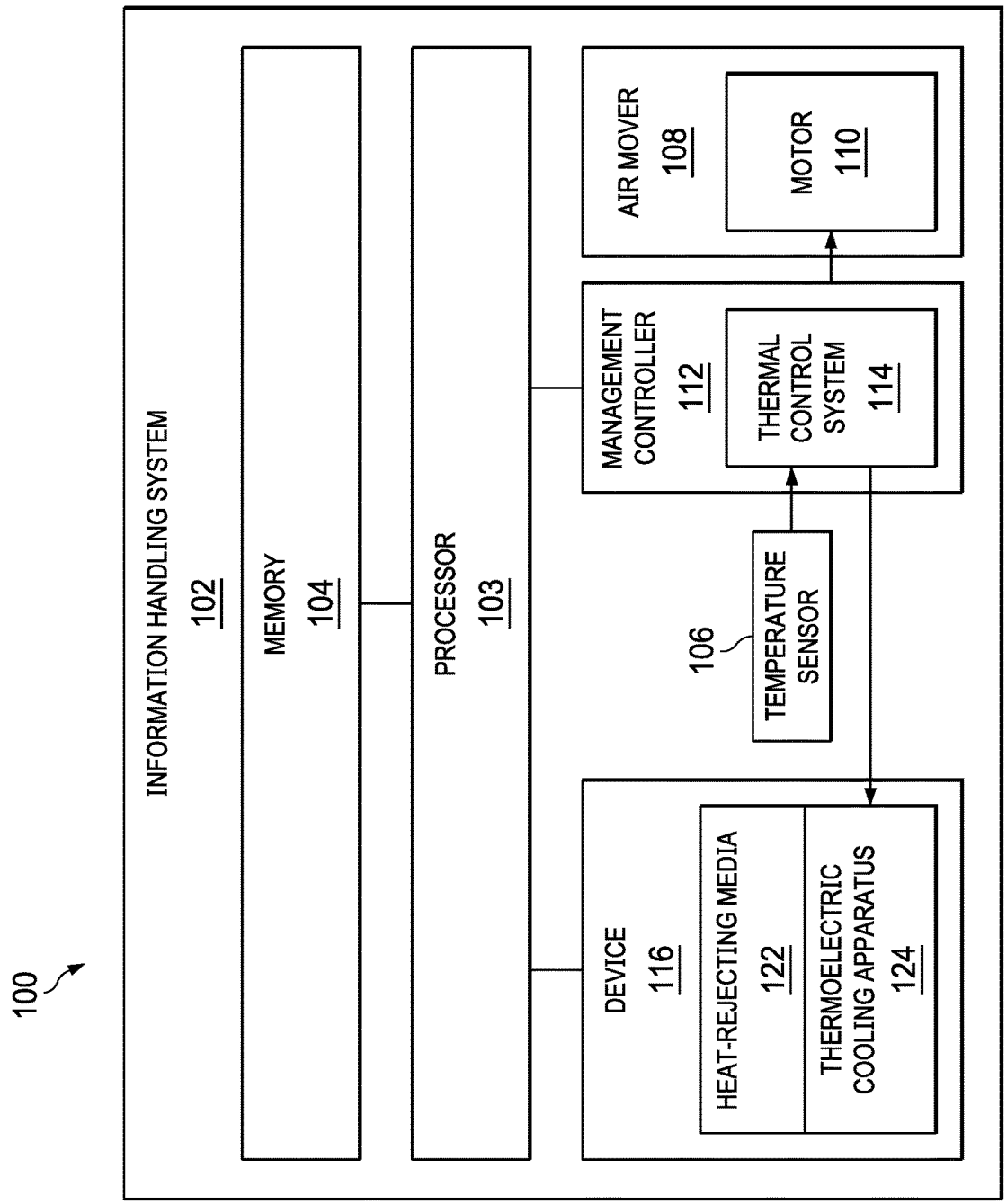
FIG. 1 illustrates a block diagram of an example information handling system, in accordance with embodiments of the present disclosure.

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data. As shown in FIG. 1, information handling system 102 may include a chassis 100 housing a processor 103, a memory 104, a temperature sensor 106, an air mover 108, a management controller 112, a device 116, heat-rejecting media 122, and a thermoelectric cooling apparatus 124.

Processor 103 may comprise any system, device, or apparatus operable to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may comprise any system, device, or apparatus operable to retain program instructions or data for a period of time. Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to information handling system 102 is turned off.

Air mover 108 may include any mechanical or electro-mechanical system, apparatus, or device operable to move air and/or other gases in order to cool information handling resources of information handling system 102. In some embodiments, air mover 108 may comprise a fan (e.g., a rotating arrangement of vanes or blades which act on the air). In other embodiments, air mover 108 may comprise a blower (e.g., a centrifugal fan that employs rotating impellers to accelerate air received at its intake and change the direction of the airflow). In these and other embodiments, rotating and other moving components of air mover 108 may be driven by a motor 110. The rotational speed of motor 110 may be controlled by an air mover control signal communicated from thermal control system 114 of management controller 112. In operation, air mover 108 may cool information handling resources of information handling system 102 by drawing cool air into an enclosure housing the information handling resources from outside the chassis, expelling warm air from inside the enclosure to the outside of such enclosure, and/or moving air across one or more heat sinks (not explicitly shown) internal to the enclosure to cool one or more information handling resources.

Management controller 112 may comprise any system, device, or apparatus configured to facilitate management and/or control of information handling system 102 and/or one or more of its component information handling resources. Management controller 112 may be configured to issue commands and/or other signals to manage and/or control information handling system 102 and/or its information handling resources. Management controller 112 may comprise a microprocessor, microcontroller, DSP, ASIC, field programmable gate array ("FPGA"), EEPROM, or any combination thereof. Management controller 112 also may be configured to provide out-of-band management facilities for management of information handling system 102. Such management may be made by management controller 112 even if information handling system 102 is powered off or powered to a standby state. In certain embodiments, management controller 112 may include or may be an integral part of a baseboard management controller (BMC), a remote access controller (e.g., a Dell Remote Access Controller or Integrated Dell Remote Access Controller), or an enclosure controller. In other embodiments, management controller 112 may include or may be an integral part of a chassis management controller (CMC).

As shown in FIG. 1, management controller 112 may include a thermal control system 114. Thermal control system 114 may include any system, device, or apparatus configured to receive one or more signals indicative of one or more temperatures within information handling system 102 (e.g., one or more signals from one or more temperature sensors 106), and based on such signals, calculate an air mover driving signal to maintain an appropriate level of cooling, increase cooling, or decrease cooling, as appropriate, and communicate such air mover driving signal to air mover 108. In addition to or in lieu of thermal-based control of a speed of an air mover 108, thermal control system 114 may further be configured to, as described in greater detail below, receive one or more signals indicative of one or more temperatures within information handling system 102 (e.g., one or more signals from one or more temperature sensors 106), and based on such signals, calculate a thermoelectric cooling control signal to maintain an appropriate level of cooling, increase cooling, or decrease cooling, as appropriate, and communicate such air mover driving signal to thermoelectric cooling apparatus 124.

Temperature sensor 106 may be any system, device, or apparatus (e.g., a thermometer, thermistor, etc.) configured to communicate a signal to management controller 112 or another controller indicative of a temperature within information handling system 102. In many embodiments, information handling system 102 may comprise a plurality of temperature sensors 106, wherein each temperature sensor 106 detects a temperature of a particular component and/or location within information handling system 102. For example, in some embodiments a temperature sensor 106 may be located within, upon, or sufficiently proximate to device 116 in order that any temperature measured by temperature sensor 106 is indicative of a temperature of device 116.

Device 116 may comprise any component information handling system of information handling system 102, including without limitation processors, buses, memories, I/O devices and/or interfaces, storage resources, network interfaces, motherboards, integrated circuit packages; electro-mechanical devices, displays, and power supplies. In some embodiments, device 116 may comprise a general-purpose graphics processing unit (GPGPU).

As shown in FIG. 1, device 116 may have mechanically and thermally coupled thereto heat-rejecting media 122. Heat-rejecting media 122 may include any system, device, or apparatus configured to transfer heat from an information handling resource (e.g., device 116, as shown in FIG. 1), thus reducing a temperature of the information handling resource. For example, heat-rejecting media 122 may include a solid thermally coupled to the information handling resource (e.g., heatpipe, heat spreader, heatsink, fin-stack, etc.) such that heat generated by the information handling resource is transferred from the information handling resource into air surrounding the information handling resource. For example, in the embodiments represented by FIG. 1, heat-rejecting media 122 may be thermally coupled to device 116 and arranged such that heat generated by device 116 is transferred to air driven by air mover 108.

Also as shown in FIG. 1, thermoelectric cooling apparatus 124 may be thermally coupled to heat-rejecting media 122. Thermoelectric cooling apparatus 124 may comprise any suitable system, device, or apparatus configured to, in response to an electrical voltage applied to it, transfer heat from one side of thermoelectric cooling apparatus 124 to another side of thermoelectric cooling apparatus 124 in accordance with the thermoelectric effect (which may also be known as the Peltier effect, among other names). As described and shown in more detail below, thermoelectric cooling apparatus 124 and heat-rejecting media 122 may be arranged such that the side of thermoelectric cooling apparatus 124 that cools when an electrical voltage is applied to it may be thermally coupled to a portion of heat-rejecting media 122 that is within an airflow path of air flowing from air mover 108 to device 116, such that thermoelectric cooling apparatus 124 cools such portion of heat-rejecting media 122, in turn cooling the airflow passing through such portion of heat-rejecting media in order to provide enhanced cooling of device 116.

In some embodiments, the side of thermoelectric cooling apparatus 124 that cools when an electrical voltage is applied to it may be thermally coupled more directly to device 116, and may cool device 116 using the thermoelectric effect without the use of airflow from air mover 108.

In addition to processor 103, memory 104, temperature sensor 106, air mover 108, management controller 112, device 116, heat-rejecting media 122, and thermoelectric cooling apparatus 124, information handling system 102 may include one or more other information handling resources. In addition, for the sake of clarity and exposition of the present disclosure, FIG. 1 depicts only one air mover 108 and one device 116. In embodiments of the present disclosure, information handling system 102 may include any number of air movers 108 and devices 116. However, in some embodiments, approaches similar or identical to those used to cool device 116 as described herein may be employed to provide cooling of processor 103, memory 104, management controller 112, and/or any other information handling resource of information handling system 102.

Figure 2:
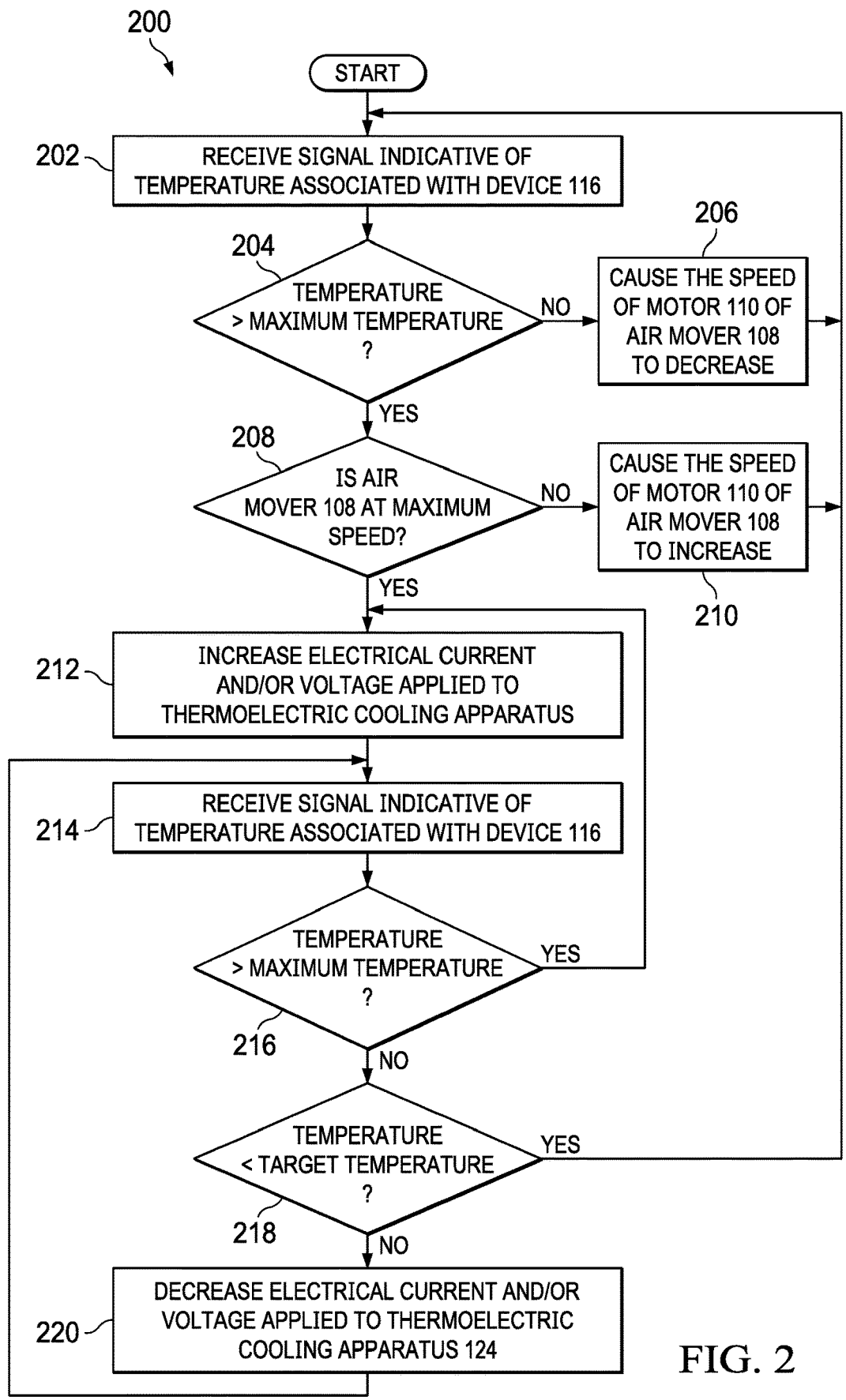
FIG. 2 illustrates a flow chart of an example method for thermal control of an information handling resource using the thermoelectric effect, in accordance with embodiments of the present disclosure.

FIG. 2 illustrates a flow chart of an example method 200 for thermal control of an information handling resource using the thermoelectric effect, in accordance with embodiments of the present disclosure. According to some embodiments, method 200 may begin at step 202. As noted above, teachings of the present disclosure may be implemented in a variety of configurations of information handling system 102. As such, the preferred initialization point for method 200 and the order of the steps comprising method 200 may depend on the implementation chosen.

At step 202, thermal control system 114 may receive a signal (e.g., from temperature sensor 106) indicative of a temperature associated with device 116. At step 204, thermal control system 114 may determine if the temperature exceeds a maximum temperature for device 116. If the temperature exceeds a maximum temperature for device 116, method 200 may proceed to step 208. Otherwise, method 200 may proceed to step 206.

At step 206, responsive to the temperature being below the maximum temperature for device 116, thermal control system 114 may cause the speed of motor 110 of air mover 108 to decrease, thus decreasing airflow. After completion of step 206, method 200 may proceed again to step 202.

At step 208, responsive to the temperature being above the maximum temperature for device 116, thermal control system 114 may determine if the speed of motor 110 of air mover 108 is at its maximum speed. If the speed of motor 110 of air mover 108 is at its maximum speed, method 200 may proceed to step 212. Otherwise, method 200 may proceed to step 210.

At step 210, responsive to the speed of motor 110 of air mover 108 being below its maximum speed, thermal control system 114 may cause the speed of motor 110 of air mover 108 to increase, thus increasing airflow. After completion of step 210, method 200 may proceed again to step 202.

At step 212, thermal control system 114 may increase an electrical current and/or voltage applied to thermoelectric cooling apparatus 124, thus increasing the temperature gradient across thermoelectric cooling apparatus 124 and cooling heat-rejecting media 122 (which may in turn further cool device 116).

At step 214, thermal control system 114 may again receive a signal (e.g., from temperature sensor 106) indicative of a temperature associated with device 116. At step 216, thermal control system 114 may determine if the temperature is above the maximum temperature for device 116. If the temperature is above the maximum temperature for device 116, method 200 may proceed again to step 212. Otherwise, method 200 may proceed to step 218.

At step 218, thermal control system 114 may determine if the temperature is below a target temperature for device 116 (which may be less than the maximum temperature). If the temperature is below the target temperature for device 116, method 200 may proceed again to step 202. Otherwise, method 200 may proceed to step 220.

At step 220, responsive to the temperature being below the target temperature for device 116, thermal control system 114 may decrease an electrical current and/or voltage applied to thermoelectric cooling apparatus 124, thus decreasing the temperature gradient across thermoelectric cooling apparatus 124. After completion of step 220, method 200 may proceed again to step 214.

Although FIG. 2 discloses a particular number of steps to be taken with respect to method 200, method 200 may be executed with greater or fewer steps than those depicted in FIG. 2. In addition, although FIG. 2 discloses a certain order of steps to be taken with respect to method 200, the steps comprising method 200 may be completed in any suitable order.

Method 200 may be implemented using a baseboard management controller 108, and/or any other system operable to implement method 200. In certain embodiments, method 200 may be implemented partially or fully in software and/or firmware embodied in computer-readable media.

Although method 200 describes applying cooling by thermoelectric cooling apparatus 124 after the speed of air mover 108 has reached its maximum speed, in some embodiments, thermoelectric cooling apparatus 124 may provide supplemental cooling before the speed of air mover 108 has reached its maximum speed.

Figure 3:
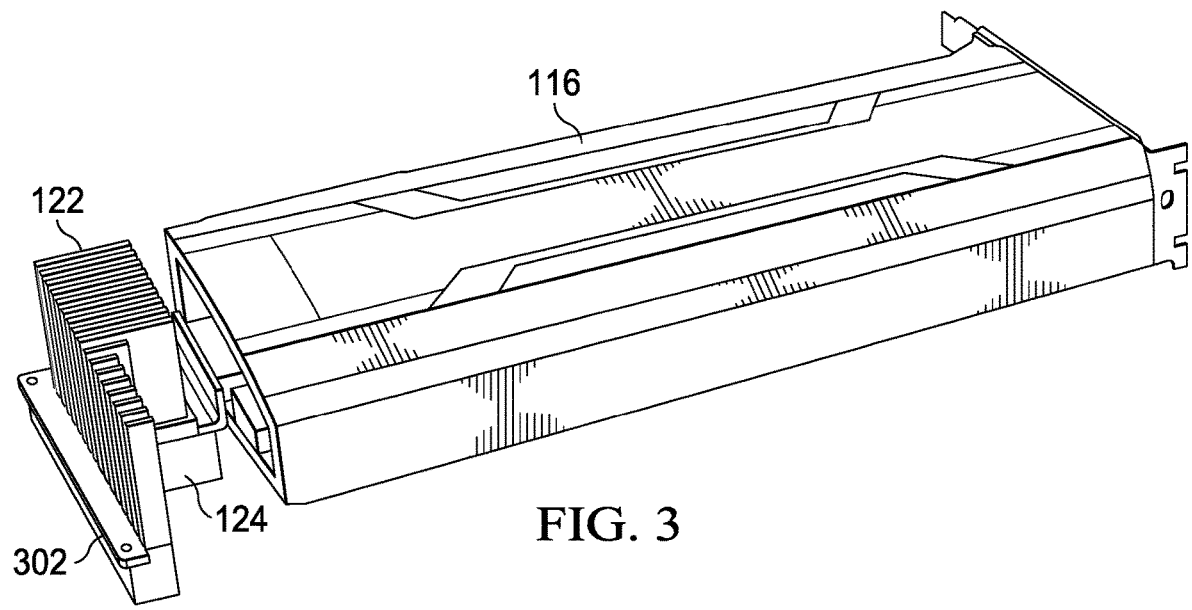
FIG. 3 illustrates a perspective view of selected components of a device, an associated extender bracket, and an associated assembly of heat-rejecting media and a thermoelectric cooling apparatus for cooling the device, in accordance with embodiments of the present disclosure.

FIG. 3 illustrates a perspective view of selected components of an example device 116, an associated extender bracket 302, and an associated assembly of heat-rejecting media 122 and thermoelectric cooling apparatus 124 for cooling device 116, in accordance with embodiments of the present disclosure.

As shown in FIG. 3, device 116 may mechanically couple to extender bracket 302. Extender bracket 302 may comprise any suitable system, device, or apparatus for mechanically adapting a form factor of device 116 to a form factor of a slot of information handling system 102 for electrically and mechanically coupling device 116 to other components of information handling system 102, for example such that an edge connector of device 102 mechanically and electrically couples to an associated receptacle connector of information handling system 102.

As also shown in FIG. 3, an assembly comprising heat-rejecting media 122 and thermoelectric cooling apparatus 124 may be mechanically coupled to extender bracket 302.

Figure 4A:
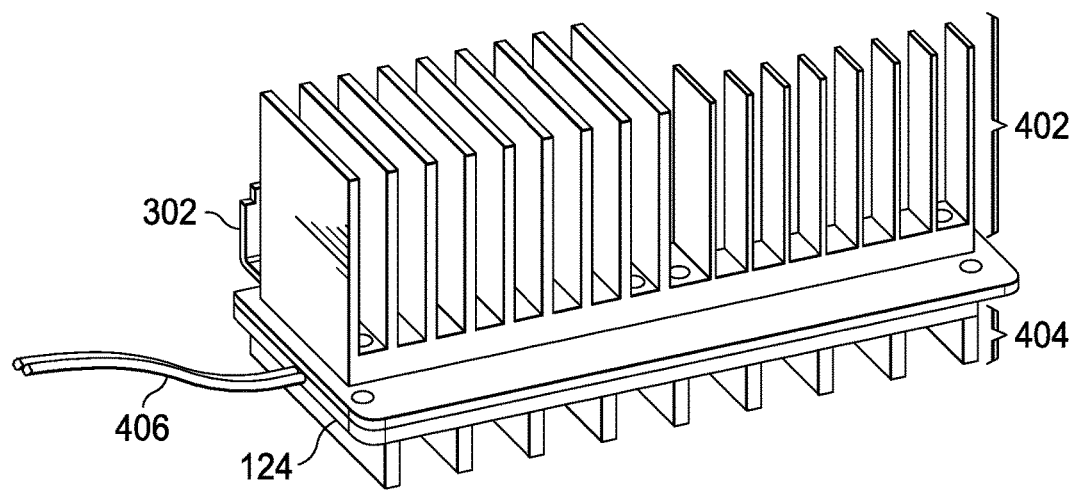
FIGS. 4A-4C illustrate various perspective views of selected components of an assembly of heat-rejecting media and a thermoelectric cooling apparatus, in accordance with embodiments of the present disclosure.
Figure 4B:
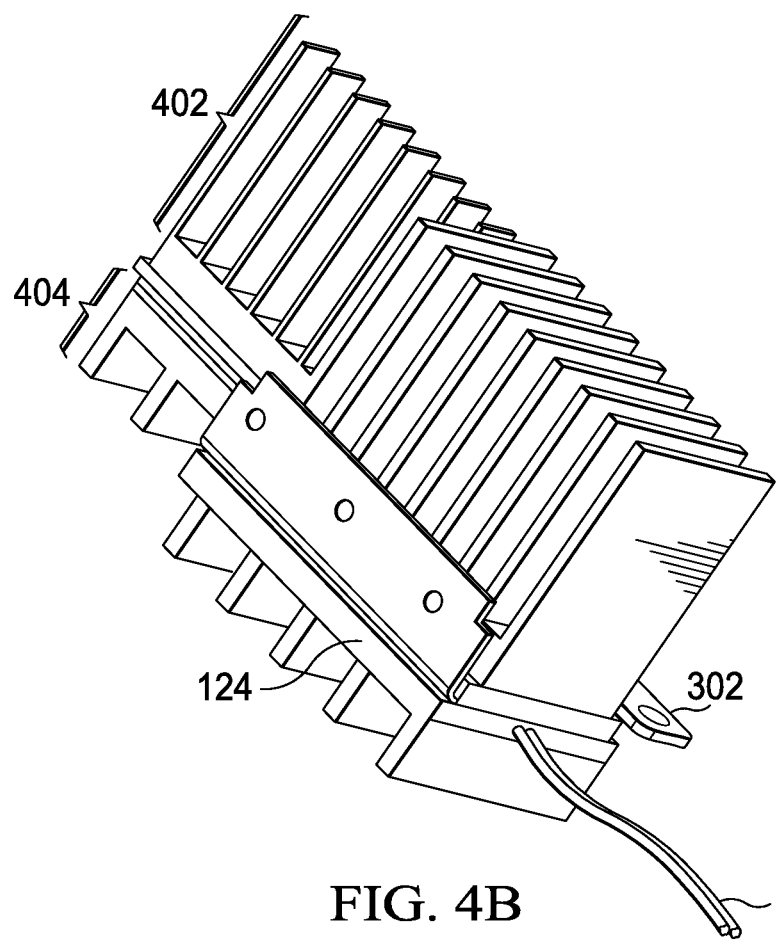
Figure 4C:
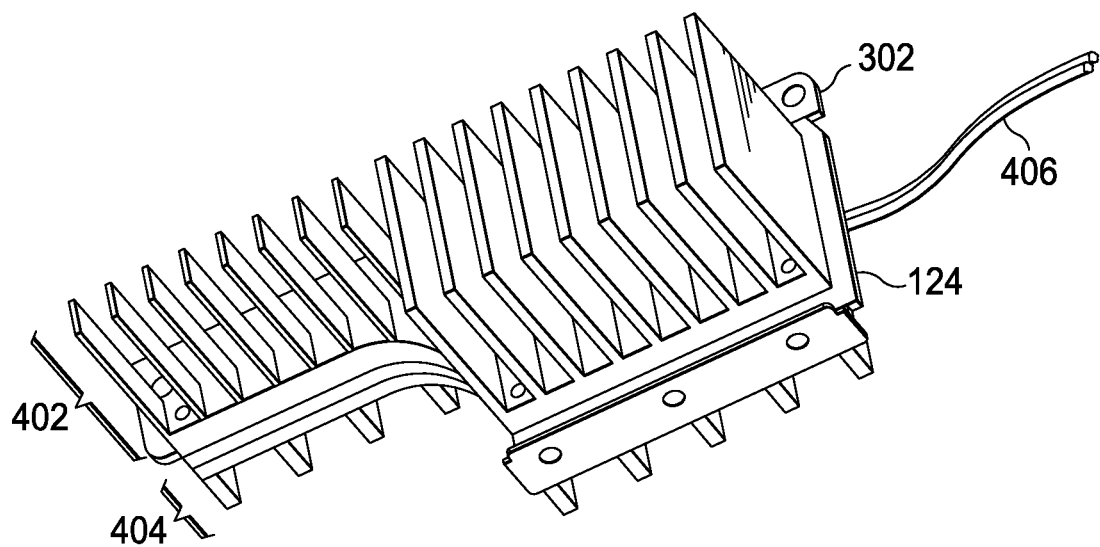

FIGS. 4A-4C illustrate various detailed perspective views of selected components of the assembly of heat-rejecting media 122 and thermoelectric cooling apparatus 124 shown in FIG. 3 as mechanically coupled to extender bracket 302, in accordance with embodiments of the present disclosure. As shown in FIGS. 4A-4C, heat-rejecting media 122 may comprise a first portion 402 (e.g., a first finstack) and a second portion 404 (e.g., a second finstack), wherein thermoelectric cooling apparatus 124 is mechanically and thermally coupled between first portion 402 and second portion 404. As also shown in FIGS. 4A-4C, thermoelectric cooling apparatus 124 may have a wire 406 or other electrical conductor(s) extending therefrom, through which thermoelectric cooling apparatus 124 may receive an electrical voltage or current (e.g., from thermal control system 114) to control a thermal gradient between opposite sides of thermoelectric cooling apparatus 124.

First portion 402 of heat-rejecting media 122 may be thermally coupled to a first side of thermoelectric cooling apparatus 124 and second portion 404 of heat-rejecting media 122 may likewise be thermally coupled to a second side of thermoelectric cooling apparatus 124, and may be arranged such that when an electrical current or voltage is applied (e.g., via wire 406) to thermoelectric cooling apparatus 124, a temperature gradient may be formed across thermoelectric cooling apparatus 124 such that the first side of thermoelectric cooling apparatus 124 decreases in temperature and the second side of thermoelectric cooling apparatus 124 increases in temperature.

Furthermore, in operation within information handling system 102, heat-rejecting media 122, thermoelectric cooling apparatus 124, and device 116 may be arranged such that first portion 402 of heat-rejecting media 122 is substantially within an airflow path between air mover 108 and device 116 and such that second portion 404 of heat-rejecting media 122 is substantially outside the airflow path between air mover 108 and device 116. Accordingly, when an electrical current or voltage is applied to thermoelectric cooling apparatus 124, the first side of thermoelectric cooling apparatus 124 may decrease in temperature, causing transfer of heat from first portion 402 of heat-rejecting media 122 to the first side of thermoelectric cooling apparatus 124, which may cause first portion 402 of heat-rejecting media 122 to decrease in temperature. Due to such decrease in temperature of first portion 402 of heat-rejecting media 122, heat present in airflow through first portion 402 that may subsequently flow proximate to device 116 may be transferred to first portion 402 of heat-rejecting media 122, which may cause a decrease in temperature of such airflow, which in turn may provide heat transfer from and cooling of device 116.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. A system comprising:
    an air mover configured to drive a flow of air;
    a heat-generating component in a path of the flow of air;
    an assembly comprising heat-rejecting media and a thermoelectric cooling apparatus thermally coupled to the heat-rejecting media and arranged such that the heat-rejecting media is in the path of the flow of air between the air mover and the heat-generating component; and
    a controller communicatively coupled to the thermoelectric cooling apparatus and configured to control an electrical parameter applied to the thermoelectric cooling apparatus in order to create a temperature gradient across the thermoelectric cooling apparatus, such that when the electrical parameter is applied to the thermoelectric cooling apparatus, heat is transferred from the flow of air to the thermoelectric cooling apparatus via the heat-rejecting media
    wherein the controller adjusts the electrical parameter applied to the thermoelectric cooling apparatus only when a temperature signal indicative of a temperature associated with the heat-generating component indicates the temperature exceed a maximum threshold and a speed of the air mover is at its maximum.

2. The system of claim 1, wherein the electrical parameter comprises at least one of a voltage and a current.

3. The system of claim 1, further comprising a temperature sensor configured to generate a temperature signal indicative of a temperature associated with the heat-generating component, and wherein the controller is configured to control the electrical parameter to vary the electrical parameter as a function of the temperature associated with the heat-generating component.

4. The system of claim 3, wherein the controller is configured to control a speed of the air mover as a function of the temperature associated with the heat-generating component.

5. The system of claim 1, further comprising an extension bracket configured to mechanically adapt a form factor of the heat-generating component to a form factor of a slot of the system for electrically and mechanically coupling the heat-generating component to other components of the system; and
    wherein the assembly is mechanically coupled to the extension bracket.

6. The system of claim 1, wherein the heat-generating component comprises an information handling resource.

7. The system of claim 6, wherein the information handling resource comprises a general-purpose graphics processing unit.

8. A method comprising, in a system comprising an air mover configured to drive a flow of air, a heat-generating component in a path of the flow of air:
    causing a flow of air driven from an air mover to be driven in a path of the flow of air proximate to heat-rejecting media of an assembly comprising the heat-rejecting media and a thermoelectric cooling apparatus thermally coupled to the heat-rejecting media and arranged such that the heat-rejecting media is in the path of the flow of air between the air mover and the heat-generating component; and controlling an electrical parameter applied to the thermoelectric cooling apparatus in order to create a temperature gradient across the thermoelectric cooling apparatus, such that when the electrical parameter is applied to the thermoelectric cooling apparatus, heat is transferred from the flow of air to the thermoelectric cooling apparatus via the heat-rejecting media;

wherein the controller adjusts the electrical parameter applied to the thermoelectric cooling apparatus only when a temperature signal indicative of a temperature associated with the heat-generating component indicates the temperature exceed a maximum threshold and a speed of the air mover is at its maximum.

9. The method of claim 8, wherein the electrical parameter comprises at least one of a voltage and a current.

10. The method of claim 8, further comprising:
receiving a temperature signal indicative of a temperature associated with the heat-generating component; and
controlling the electrical parameter to vary the electrical parameter as a function of the temperature associated with the heat-generating component.

11. The method of claim 10, further comprising controlling a speed of the air mover as a function of the temperature associated with the heat-generating component.

12. The method of claim 8, wherein the assembly is mechanically coupled to an extension bracket configured to mechanically adapt a form factor of the heat-generating component to a form factor of a slot of the system for electrically and mechanically coupling the heat-generating component to other components of the system.

13. The method of claim 8, wherein the heat-generating component comprises an information handling resource.

14. The method of claim 13, wherein the information handling resource comprises a general-purpose graphics processing unit.

15. An assembly comprising:
a heat-generating component;
heat-rejecting media; and
a thermoelectric cooling apparatus thermally coupled to the heat-rejecting media, wherein the thermoelectric cooling apparatus is configured to create a temperature gradient across the thermoelectric cooling apparatus when an electrical parameter is applied to the thermoelectric cooling apparatus, such that when the electrical parameter is applied to the thermoelectric cooling apparatus, heat is transferred from a flow of air to the thermoelectric cooling apparatus via the heat-rejecting media;

wherein the assembly is arranged such that the heat-rejecting media is configured to be in a path of the flow of air between an air mover and the heat-generating component;

wherein the controller adjusts the electrical parameter applied to the thermoelectric cooling apparatus only when a temperature signal indicative of a temperature associated with the heat-generating component indicates the temperature exceed a maximum threshold and a speed of the air mover is at its maximum.

16. The assembly of claim 15, wherein the electrical parameter comprises at least one of a voltage and a current.

17. The assembly of claim 15, wherein the electrical parameter is controlled as a function of a temperature associated with the heat-generating component.

18. The assembly of claim 15, wherein the assembly is mechanically coupled to an extension bracket configured to mechanically adapt a form factor of the heat-generating component to a form factor of a slot of a system for electrically and mechanically coupling the heat-generating component to other components of the system.

19. The assembly of claim 15, wherein the heat-generating component comprises an information handling resource.

20. The assembly of claim 19, wherein the information handling resource comprises a general-purpose graphics processing unit.

* * * * *